United States Patent [19]

Schols et al.

[11] Patent Number: 4,559,375

[45] Date of Patent: Dec. 17, 1985

[54] LOW STYRENE EMISSION VINYL ESTER RESIN FOR FIBER-REINFORCED APPLICATIONS

[75] Inventors: John A. Schols; Keechung Yu, both of Sarnia, Canada

[73] Assignee: The Dow Chemical Company, Midland, Mich.

[21] Appl. No.: 691,604

[22] Filed: Jan. 14, 1985

[51] Int. Cl.$^4$ .................... C08L 63/00; C08L 63/10
[52] U.S. Cl. .................... 523/449; 524/285; 524/455; 524/464
[58] Field of Search ............ 523/449; 524/285, 464, 524/455

[56] References Cited

U.S. PATENT DOCUMENTS

| | | | |
|---|---|---|---|
| 2,553,718 | 5/1951 | Newey | 523/455 |
| 3,297,782 | 1/1967 | Barkis et al. | 523/465 |
| 3,468,835 | 9/1969 | Dereich | 523/455 |
| 3,900,661 | 8/1975 | McCombs | 524/188 |
| 3,926,893 | 12/1975 | Woodward | 524/285 |
| 4,069,378 | 1/1978 | DeMarco | 526/225 |
| 4,128,527 | 12/1978 | Kinjo et al. | 523/513 |
| 4,276,208 | 6/1981 | Ogawa et al. | 523/465 |
| 4,455,400 | 6/1984 | Johnson | 523/455 |

FOREIGN PATENT DOCUMENTS

| | | | |
|---|---|---|---|
| 0074537 | 7/1978 | Japan | 524/285 |
| 0092853 | 8/1978 | Japan | 524/285 |

*Primary Examiner*—Herbert J. Lilling

[57] ABSTRACT

Low styrene emission vinyl ester resin compositions containing an adhesion promoter, such as lanolin. Said VER composition exhibits desirable physical properties such as low styrene emission and excellent adhesive bond strength.

7 Claims, No Drawings

LOW STYRENE EMISSION VINYL ESTER RESIN FOR FIBER-REINFORCED APPLICATIONS

BACKGROUND OF THE INVENTION

This invention relates to an improved novel low styrene emission vinyl ester resin formulation which exhibits desirable adhesion characteristics in fiber-reinforced applications.

Vinyl ester resins (hereinafter VER) are useful in corrosion resistant applications such as pipes, vessels, scrubbers and smoke stacks. Also, VER are utilized in the fabrication of glass fiber-reinforced products. The VER are admixed with styrene as a reactive diluent to reduce the viscosity of the VER. The presence of styrene in the VER composition results in the emission of styrene vapors into the work atmosphere. Due to the increased attention given to styrene from the industrial hygiene point of view, several methods of reducing the styrene emission have been described in the art. One such method, described in Nylander, U.S. Pat. No. 4,201,826, includes the addition to the unsaturated polyester/styrene composition of a film-forming additive such as paraffin wax to inhibit the vaporization of the styrene.

Although the paraffin wax provides a desirable decrease in styrene vapor emission, it has been found that the paraffin wax additive results in a substantial loss in the adhesive properties of the VER to the reinforcing medium.

Therefore, it would be desirable to provide a low styrene emission VER composition which exhibits adhesion properties comparable to or improved over a VER composition without the paraffin wax additive.

SUMMARY OF THE INVENTION

The present invention stems from the discovery of the benefits of a complex mixture of alcohols, fatty acids and hydrocarbons as an adhesion promoter in a VER composition wherein the styrene emission has been inhibited by the presence of paraffins in the VER composition. The VER composition is improved by the addition of an adhesion promoter in the form of a complex mixture of esters of water-insoluble alcohols, higher fatty acids and a small proportion of hydrocarbons.

A particular VER composition used in the present invention is one comprising: (1) a VER; (2) styrene as a reactive diluent; (3) paraffin as a styrene emission inhibitor; and (4) an adhesion promoter in the form of a complex mixture of esters of water-insoluble alcohols, higher fatty acids and a small proportion of hydrocarbons. Such adhesion promoter is preferably lanolin and is present in amounts sufficient to increase the adhesion characteristic of the VER composition (without the lanolin) with the reinforcing material.

The improved adhesion characteristic of the present invention will provide a desirable low styrene emission VER composition which is capable of utilization in the fabrication of a range of fiber reinforced plastic structures and equipment.

DETAILED DESCRIPTION OF THE INVENTION

The present invention relates to an improved, low styrene emission, VER composition containing: (1) a VER; (2) styrene as a reactive diluent; (3) paraffin as a styrene emission inhibitor; and (4) an adhesion promoter for fiber-reinforced applications. The improvement comprises a VER composition including an adhesion promoter which is a complex mixture of esters of water-insoluble alcohols, saturated higher fatty acids, and a small proportion of hydrocarbons. The said complex mixture is present in an amount sufficient to increase the adhesion characteristic of the VER composition (without the complex mixture of alcohols, acids and hydrocarbons) with the reinforcing material.

For the purpose of this invention, unless otherwise distinguished, the term "VER composition" means a composition comprising a VER, a reactive diluent, a styrene emission inhibitor and an adhesion promoter.

The VER herein may be an esterification product of a polyepoxide and a monounsaturated monocarboxylic acid. An early patent, U.S. Pat. No. 3,179,623, describes the above reactions and resins. Further details about the resins and conditions and methods of making them can be found in the following U.S. Pat. Nos. 3,301,743; 3,317,465; 3,377,406; 3,256,226 and 3,367,992. All the above patents are incorporated herein by reference. An example of the said VER includes that VER sold by The Dow Chemical Company under the tradename Derakane ®.

During the fabrication of various end products from a VER it is desirable to reduce the viscosity of the VER in order to facilitate the processing. A reactive diluent is utilized to reduce the viscosity of the VER. Generally, the reactive diluent is present in amounts ranging from about 25 to about 55 weight percent of the VER composition depending on the monomer selected, other additives employed and other factors. Typical reactive diluents include styrene, vinyl toluene, halogenated styrenes, alkyl substituted styrenes, acrylic and methacrylic esters, hydroxylalkyl esters of acrylic and methylacrylic acid, and the like. Most preferably, the reactive diluent is styrene.

The physical properties of the VER composition comprising a VER and a reactive diluent may be modified by adding various materials to the resin. For example, inert reinforcing materials such as glass fibers and inert fillers such as calcium carbonate or kaolin clay are both commonly employed to improve physical properties of the VER composition and reduce costs.

The volatility of the reactive diluent, such as styrene, results in the emission of styrene vapor from the VER composition. The present composition employs a film-forming additive, i.e., paraffin wax, to inhibit the emission of styrene into the work atmosphere. The paraffin wax is preferably utilized in amounts ranging from about 0.1 to about 5 weight percent of the said VER composition. Most preferably, in amounts ranging from about 0.25 to about 0.5 weight percent of the VER composition.

The utilization of a paraffin wax as a film-forming inhibitor results in effective inhibition of styrene emission. However, a drawback of the use of the paraffin wax in the fiber-reinforced VER compositions is the undesirable loss of adhesion bond strength between the fiber fillers and the VER composition. Such adhesion bond strength is qualitatively measured by examining the amount of fibers present in the break pattern of a VER laminate that has been separated. In other words, the more fibers present in the break surface, the better the adhesive bond strength of the VER composition. Where the break surface is clean, i.e., very few glass fibers, the adhesive bond strength is poor.

It has been found that the utilization of an adhesion promoter comprising a mixture of esters of water-insoluble alcohols, higher fatty acids and a minor proportion of hydrocarbons results in a low styrene emission VER composition which exhibits desirable adhesive bond strength to the glass fibers. This complex mixture of alcohols, acids and hydrocarbons is preferably lanolin.

Lanolin is a natural product derived from the refining of wool grease. See, Kirk-Othmer, 3rd Ed., Vol. 24, pages 636–639, which is incorporated herein as a reference. The wool grease is extracted from the wastewaters produced from the extracted scouring of natural wool and comprises the contaminants on the wool, mainly grease, dirt, suint and protein material. Considerable efforts have been made to identify the components of lanolin, but the various sources and analytical techniques have complicated the analysis. Nevertheless, some information has been produced concerning the components of lanolin.

The alcohol fraction of lanolin is a complex mixture of both aliphatic and cyclic compounds. The primary components are cholesterol, lanosterol, and dihydrolanosterol. See Table I for the average composition of the alcohol fraction.

The fatty acid fraction is predominately alkanoic, $\alpha$-hydroxy, and $\omega$-hydroxy acids. Each acid group contains normal, iso, and anteiso series of various chain lengths. Nearly all of the acids are saturated. See Table II for the average composition of the acid fraction.

The minor hydrocarbon fraction shows structural similarity to the fatty acid fraction or aliphatic alcohols and contains highly branched alkanes as well as cycloalkanes.

TABLE I

Summary of the Average Composition of Wool-Wax Alcohols*

| Alcohol | Chain Length | Approximate percent of Wool-Wax Alcohols |
| --- | --- | --- |
| normal monoalcohols | $C_{14}-C_{34}$ | 2 |
| iso monoalcohols | $C_{14}-C_{36}$ | 13 |
| anteiso monoalcohols | $C_{17}-C_{35}$ | |
| normal alkan-1,2-diols | $C_{12}-C_{25}$ | 1 |
| iso alkan-1,2-diols | $C_{14}-C_{30}$ | 6 |
| anteiso alkan-1,2-diols | $C_{15}-C_{29}$ | |
| Total | | 22 |
| cholesterol | | 34 |
| lanosterol | | 38 |
| dihydrolanosterol | | |
| Total | | 72 |
| hydrocarbons | | 1 |
| autooxidation products | | 5 |
| undetermined | | |

*Kirk-Othmer, Encyclopedia of Chemical Technology, Vol. 24, 3rd ed., p. 638 (1984).

TABLE II

Summary of the Average Composition of Wool-Wax Acids*

| Acids | Chain Length | Wool-Wax acids, percent |
| --- | --- | --- |
| normal acids | $C_8-C_{38}$ | 10 |
| iso acids | $C_8-C_{40}$ | 22 |
| anteiso acids | $C_7-C_{41}$ | 28 |
| normal $\alpha$-hydroxy acids | $C_{10}-C_{32}$ | 17 |
| iso $\alpha$-hydroxy acids | $C_{12}-C_{34}$ | 9 |
| anteiso $\alpha$-hydroxy acids | $C_{11}-C_{33}$ | 3 |
| normal $\omega$-hydroxy acids | $C_{22}-C_{36}$ | 3 |
| iso $\omega$-hydroxy acids | $C_{22}-C_{36}$ | 0.5 |
| anteiso $\omega$-hydroxy acids | $C_{23}-C_{35}$ | 1 |
| polyhydroxy acids | | 4.5 |
| unsaturated acids | | 2 |

*Kirk-Othmer, Encyclopedia of Chemical Technology, Vol. 24, 3rd ed., p. 638 (1984).

It is preferable to have the said complex mixture of esters of water-insoluble alcohols, saturated higher fatty acids, and a small proportion of hydrocarbons present in an amount sufficient to increase the adhesion characteristic of a VER composition with a reinforcing material used therewith. More preferably, in an amount ranging from about 0.1 to about 5 weight percent of the VER composition and most preferably in an amount ranging from about 0.25 to about 1 weight percent of the VER composition. The VER composition of this invention shows improved adhesion bond strength as compared to the low styrene emission VER base which does not contain an adhesion promoter. Such VER compositions are useful in fabricating a range of fiber-reinforced plastic structures and equipment by all fabricating methods.

The following example is provided to illustrate the invention but is not intended to limit the scope thereof. All parts are percentages by weight unless otherwise indicated.

EXAMPLE 1

A multilayer laminate is prepared from Derakane ® 411-45 using the following composition:

| Component | Weight Percent |
| --- | --- |
| Derakane 411-45 | 90.35 |
| Paraffin Wax P52 | 0.25 |
| Lanolin | 0.50 |
| Styrene | 8.90 |

A three layer 12 inch by 12 inch laminate is prepared containing 128 grams (g) (30 percent) of glass fibers and 300 g of the above composition cured with 0.9 g of cobalt naphthenate (6 percent), 0.15 g of dimethylaniline and 3 g of methylethylketone peroxide (60 percent). In the above composition, the Derakane 411-45 contains 45 percent styrene, and the additional 8.9 weight percent styrene is used to dissolve the wax and lanolin. The styrene loss is measured by the amount of weight loss of the three-ply laminate over the period of time required for complete curing. The above laminate is found to lose 10.2 g of styrene.

After the determination of the styrene loss, another three layers are added to the original laminate. The first three layers of laminate are partially separated from the second three layers of laminate by a strip of Mylar film. Such a strip of Mylar facilitates the prying apart of the layers in order to provide a break surface from which the adhesion bond strength may be qualitatively measured. The laminate is allowed to fully cure before it is pryed apart.

The degree of adhesion bond strength between the glass fibers and the resin is judged by the amount of glass fibers present in the break pattern. The test was run on four laminates prepared in the same manner as discussed above. The more glass fibers which are present in the break surface the better the adhesion bond strength of the resin to the glass fibers. Where the break is clean, i.e., where there are very few glass fibers present, the adhesion bond strength is poor. The results are summarized below in Table III.

EXAMPLE A

A similar three-ply laminate, less the paraffin wax and lanolin, is prepared similarly as described hereinabove in Example 1. The styrene loss is measured as discussed in Example 1 and is found to be 17.1 g. The results are summarized in Table III.

EXAMPLE B

A similar three-ply laminate, less the lanolin, is prepared similarly as described hereinabove in Example 1. After complete curing another three layers of the instant composition are added to the original laminate as in Example 1. The adhesion bond strength between the glass fibers and the resin is judged by the method of Example 1. The results are summarized in Table III.

TABLE III

| Example | Additives (Weight Percent) | Adhesion Rating | Styrene Loss (Grams) |
|---------|---------------------------|-----------------|----------------------|
| 1 | Paraffin[1] (0.25) Lanolin (0.5) | Excellent | 10.2 |
| A | None | Excellent | 17.1 |
| B | Paraffin[1] (0.25) | Poor | 9.3 |

[1]Paraffin wax with a melting point of 52° C.

The results indicate Applicant's VER composition exhibits low styrene emission and excellent adhesion bond strength between the VER composition and the glass fibers.

What is claimed is:

1. An improved, low styrene emission, VER composition containing: (1) a VER which is an esterification product of a polyepoxide and a monounsaturated monocarboxylic acid; (2) styrene as a reactive diluent; (3) paraffin as a styrene emission inhibitor; and (4) wherein the improvement comprises including in such composition lanolin wherein said lanolin is present in an amount sufficient to increase the adhesion characteristic of the VER composition with a reinforcing material used therewith.

2. The VER composition of claim 1 wherein the said lanolin is about 0.1 to about 5 weight percent of the said VER composition.

3. The VER composition of claim 1 wherein the said lanolin is about 0.25 to about 1 weight percent of the said VER composition.

4. The VER composition of claim 1 wherein the said reinforcing material is glass fibers.

5. The VER composition of claim 1 wherein the said paraffin wax is about 0.1 to about 5.0 weight percent of the said VER composition.

6. The VER composition of claim 1 wherein the said paraffin wax is about 0.25 to about 0.5 weight percent of the said VER composition.

7. The VER composition of claim 1 wherein the said paraffin is a paraffin wax P52 which has a melting point of 52° C.

* * * * *